(12) United States Patent
Hayes et al.

(10) Patent No.: US 7,963,186 B2
(45) Date of Patent: Jun. 21, 2011

(54) ANCILLARY OIL PUMPING FOR GEAR BOX ASSEMBLY

(75) Inventors: Brian David Hayes, Newark, OH (US); Lawrence Doyle Brill, Westerville, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 1037 days.

(21) Appl. No.: 11/402,672

(22) Filed: Apr. 12, 2006

(65) Prior Publication Data

US 2007/0251348 A1 Nov. 1, 2007

(51) Int. Cl.
*F16H 57/04* (2010.01)
*F16H 61/00* (2006.01)
*F03C 2/00* (2006.01)

(52) U.S. Cl. .......... 74/467; 74/606 R; 184/6.12; 418/15; 418/206.4

(58) Field of Classification Search ................ 74/606 R, 74/467; 184/6.12, 65, 6.13, 26, 27.1, 29; 418/206.2, 15, 159, 206.1, 206.4
See application file for complete search history.

(56) References Cited

U.S. PATENT DOCUMENTS

| | | | | |
|---|---|---|---|---|
| 1,937,367 A | * | 11/1933 | Vickers | 418/74 |
| 2,996,999 A | * | 8/1961 | Trautman | 418/126 |
| 3,529,698 A | * | 9/1970 | Nelson | 184/6.12 |
| 3,601,515 A | * | 8/1971 | Pelizzoni | 418/206.4 |
| 4,266,915 A | * | 5/1981 | McBurnett et al. | 418/126 |
| 4,971,534 A | * | 11/1990 | Rustige | 418/132 |
| 6,616,432 B2 | * | 9/2003 | Szczepanski et al. | 418/126 |
| 2004/0000445 A1 | * | 1/2004 | Smith et al. | 180/308 |
| 2005/0271538 A1 | * | 12/2005 | Knighton et al. | 418/206.1 |
| 2006/0035741 A1 | * | 2/2006 | Mierisch et al. | 475/160 |

* cited by examiner

*Primary Examiner* — Thomas R Hannon
*Assistant Examiner* — Alan B Waits
(74) *Attorney, Agent, or Firm* — Carlson, Gaskey & Olds, PC

(57) ABSTRACT

A gear box assembly as used in an inverted portal axle or transfer case includes a drive gear and at least one driven gear in meshing engagement with the drive gear at a contact point. A gear housing closely surrounds portions of an outer circumference of the drive and driven gears to form a baffle area. The gear housing includes an discharge orifice that is located near the contact point and a fluid gallery that extends from the discharge orifice to other locations within the gear housing. As the drive gear drives the driven gear, fluid is pumped into the discharge orifice and through the fluid gallery to fluid outlets positioned at desired locations to lubricate other gear box components. Radial inlets with elongated chamfers and stator vanes can be formed within the gear housing to draw air ingested during pumping away from the discharge orifice. Additionally, a bypass loop can be used to scavenge unwanted air ingested into meshing gear teeth.

34 Claims, 8 Drawing Sheets

US 7,963,186 B2

ANCILLARY OIL PUMPING FOR GEAR BOX ASSEMBLY

TECHNICAL FIELD

A gear box assembly includes a gear set with a gear housing having an orifice formed near a gear contact point such that fluid is pumped by the gear set through the orifice to selectively lubricate other gear box components within the gear housing.

BACKGROUND OF THE INVENTION

Gear boxes are used in many different drivetrain applications within a vehicle, including transfer case and inverted portal axle applications. The gear boxes include components such as gears, bearings, thrust washers, shafts, etc. that are housed within a gear housing. These components need to be sufficiently lubricated during operation to minimize fatigue and wear.

Traditionally, lubrication has been provided by a "splash" lubrication method. In the "splash" lubrication method oil is flung or splashed about within the gear housing as a result of various movements of the components in the gear box. This method can present difficulties with applications that have large vertical separation between gears, such as in inverted portal axle and transfer case applications. Ensuring an adequate supply of lubrication in such applications is often difficult to achieve. Thus, not all of the gear box components receive a consistent and reliable supply of lubrication, which can lead to premature wear or failure.

Elevated fill levels and trial and error test lab developments have been proposed as solutions to this problem. However, these solutions also have disadvantages. Elevated fill levels often result in churning losses and excessive heat generation, which adversely effects the operation of the gear box. Trial and error test lab developments are often tedious and can lead to long development times.

Thus, there is a need for a simple and effective pumping mechanism for a gear box that can consistently and adequately lubricate gear box components.

SUMMARY OF THE INVENTION

A gear box assembly includes a drive gear and at least one driven gear in meshing engagement with the drive gear at a contact point. A gear housing closely surrounds portions of the drive and driven gears to form a baffle area. The gear housing includes an discharge orifice that is located near the contact point and a fluid gallery or passage that extends from the discharge orifice to other locations within the gear housing. As the drive gear drives the driven gear, fluid is pumped into the discharge orifice and through the fluid gallery to fluid outlets positioned at desired locations to lubricate other gear box components.

The gear housing includes a first housing portion that extends along an outer circumference of the drive gear and a second housing portion that extends along an outer circumference of the driven gear. The first and second housing portions each include a base wall that is at the outer circumference, and a pair of side walls that extend in close proximity to both side edges of the drive and driven gears. The combination of the base wall and side walls, which extend along portions of the drive and driven gears near the contact point, forms the baffle area. This baffle area can be either a discharge baffle or a suction baffle depending on which side of the mesh the baffles are formed.

In one example configuration, the gear housing includes a radial inlet formed within each of the first and second housing portions. The radial inlets help direct fluid to the contact point. The radial inlets can include an elongated chamfer that extends in a direction generally toward the contact point. The first and second housing portions can also include stator vanes formed near side edges of the drive and driven gears. The radial inlets, elongated chamfers, and stator vanes cooperate with each other to draw air ingested during pumping away from the discharge orifice.

In another example configuration, a suction baffle is utilized to draw entrapped air away from gear teeth before the entrapped air reaches the discharge orifice. The suction baffle is formed as a housing portion that closely surrounds a portion of the drive and driven gears opposite from the first and second housing portions that form the discharge baffle. At least one of the first and second housing portions that form the discharge baffle includes an inlet adjacent the discharge orifice and a bypass loop port that draws ingested air away from the gear teeth while increasing the oil flow into the inlet port.

The gear box assembly can be utilized for many different applications including inverted portal axles or transfer cases, for example. In a transfer case application the drive gear receives driving input from a drive source and the driven gear is operably connected to at least one output shaft that drives another drivetrain component. In an inverted portal axle application, the drive gear receives driving input from a differential gear assembly and the driven gear is operably connected to drive a wheel output shaft.

The subject invention provides a simple pumping mechanism that effectively lubricates specified locations within a gear box assembly. These and other features of the present invention can be best understood from the following specification and drawings, the following of which is a brief description.

DETAILED DESCRIPTION OF THE PREFERRED EMBODIMENT

Figure 1A:
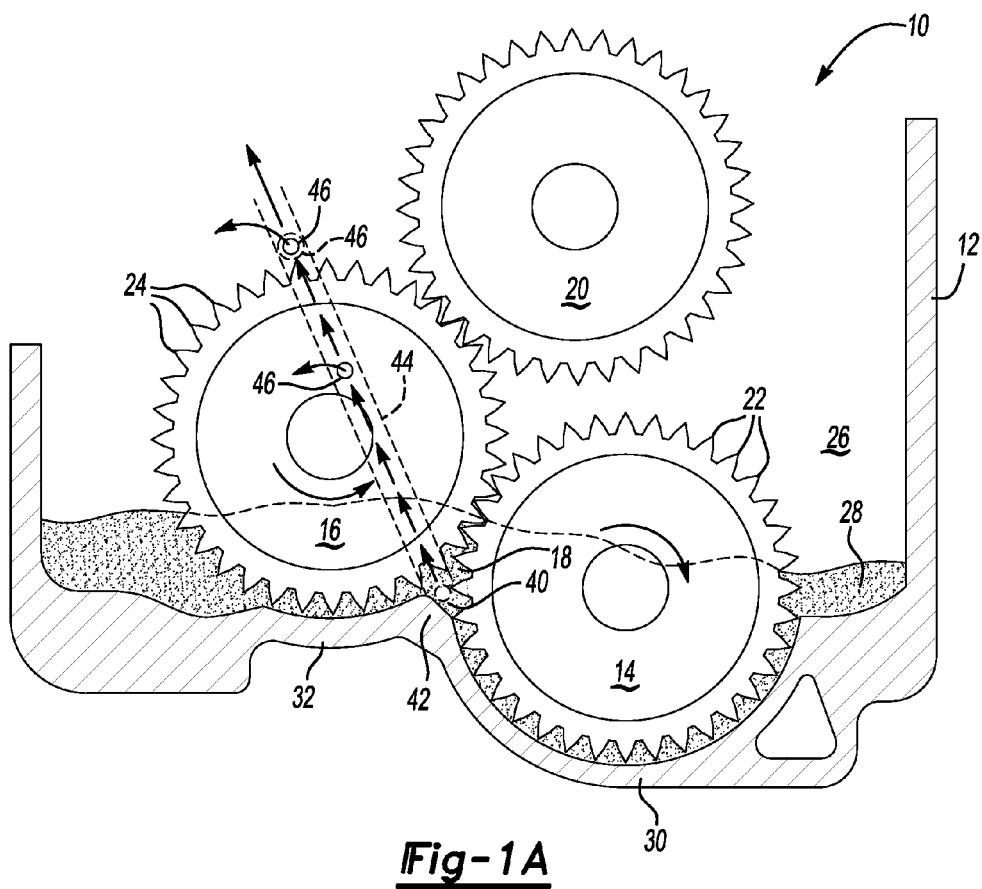
FIG. 1A is an end view, shown in partial cross-section, of a gear box assembly incorporating the subject invention.

FIG. 1A shows a gear box assembly 10 including a housing 12, a drive gear 14, and a driven gear 16 in meshing engagement with the drive gear 14 at a contact point 18. The driven gear 16 can be an output gear for driving a vehicle component, or can be an idler or intermediary gear that is used to drive another output gear 20.

The drive gear 14 includes a gear body with a plurality of drive gear teeth 22 formed about an outer circumference of the drive gear 14. The driven gear 16 includes a gear body with a plurality of driven gear teeth 24 formed about the outer circumference of the driven gear. The plurality of drive gear teeth 22 are in direct meshing engagement with the plurality of driven gear teeth 24.

The housing 12 defines an inner cavity 26 that holds lubrication fluid 28, such as oil for example. The drive 14 and driven 16 gears are mounted within the inner cavity 26 and are preferably positioned such that at least a portion of one of the gear bodies is immersed in the lubrication fluid 28.

The housing 12 includes a bottom wall having a first housing portion 30 and a second housing portion 32. The first housing portion 30 closely surrounds a portion of the outer circumference of the drive gear 14 to form a first baffle. The second housing portion 32 closely surrounds a portion of the outer circumference of the driven gear 16 to form a second baffle. The first 30 and second 32 housing portions do not extend about the entire circumference of the drive 14 and driven 16 gears. Preferably, about half, or less than half, of the circumferential distance of the drive 14 and driven 16 gears is surrounded by the first 30 and second 32 housing portions.

Figure 1B:
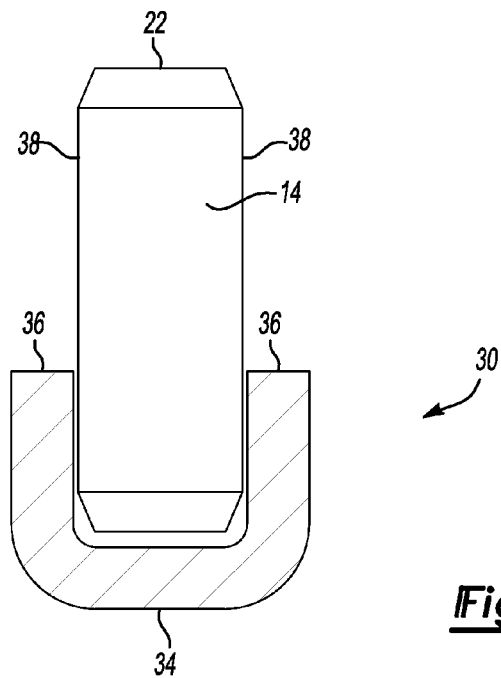
FIG. 1B is a schematic side view of one gear from the gear box assembly shown in FIG. 1A.

The first and second baffles also surround sides of the drive 14 and driven gears. This is shown in greater detail in FIG. 1B with regard to the drive gear 14. The first housing portion 30 that forms the first baffle includes a bottom wall portion 34 and a pair of side walls 36. The side walls 36 are placed in very close proximity to opposing side faces 38 of the drive gear 14. The second baffle for the driven gear 16 is similarly formed. Thus, the baffles are formed to closely surround only lower portions of the drive 14 and driven 16 gears. The baffles can be either discharge or suction baffles depending upon which side of the gear mesh the baffles are formed.

A discharge orifice 40 is formed within the housing 12 near the contact point 18 between the drive 14 and driven 16 gears. The housing 12 includes a protruding portion 42 that extends inwardly between the drive 14 and driven 16 gears toward the contact point 18. The first housing portion 30 transitions into the protruding portion 42, which transitions into the second housing portion 32.

The housing 12 includes a fluid passage or gallery 44 (indicated schematically with dashed lines in FIG. 1A) that extends from the discharge orifice 40 to other locations within the housing 12. The fluid gallery 44 is preferably a cored passage within the housing 12 and includes at least one outlet port 46 that distributes lubrication fluid 28 to desired locations within the housing 12. As the drive gear 14 drives the driven gear 16 within the first and second baffles, a pumping effect is generated that forces lubrication fluid 28 into the discharge orifice 40 and through the fluid gallery 44 to the outlet port 46. Preferably, the fluid gallery 44 includes multiple outlet ports 46 such that lubrication fluid can be distributed to many different specified locations within the housing 12. The outlet ports 46 can have different sizes from each other, as indicated by the dashed lines, to tune the amount of lubrication fluid 28 that is delivered to each specified location.

Thus, without adding any additional components to the gear box assembly 10, a pumping mechanism for lubricating gear box components is easily provided by forming baffles, a discharge orifice 40, and a fluid gallery within the housing 12. This pumping mechanism comprises a forced lubrication system that provides low or moderate pressure fluid flow that is directed as needed with an intentionally low volumetric efficiency.

By using a forced and precisely directed fluid flow, lower fluid levels within the housing 12 can be utilized as speed dependency and variability of splash lubrication methods are eliminated. Also, the pumping mechanism increases fluid circulation in a controlled manner such that fluid cooling can be provided, which is not possible with traditional splash lubrication methods.

Figure 2:
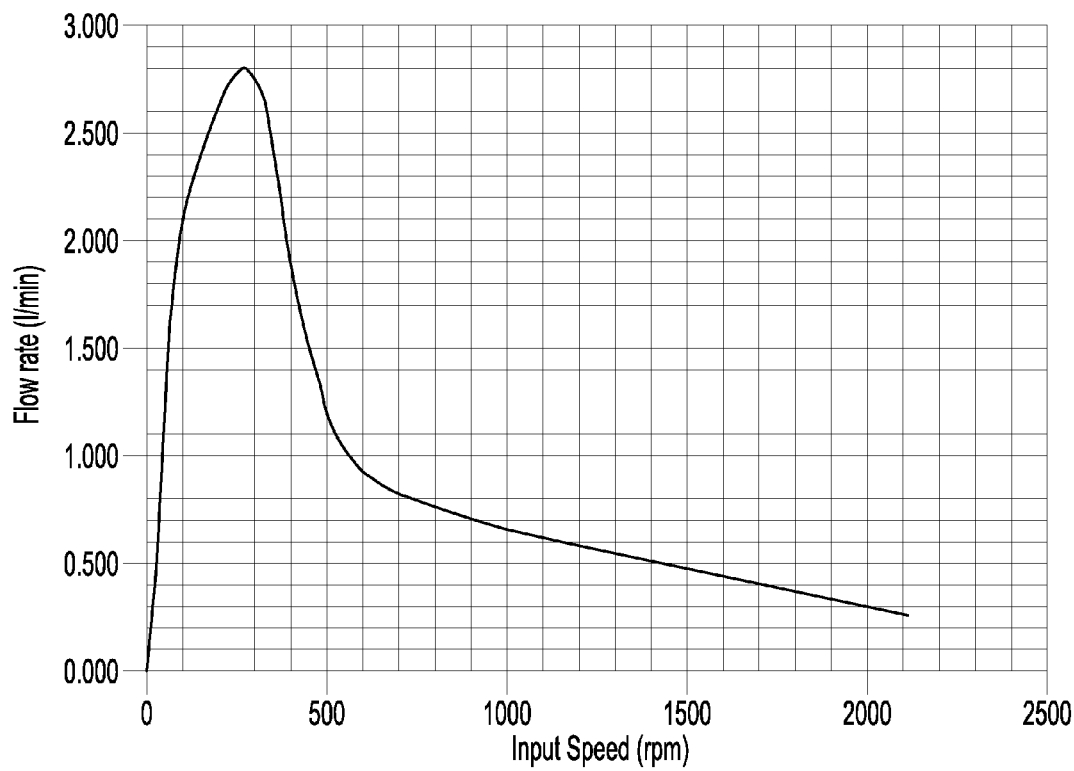
FIG. 2 is a graph of flow rate vs. input speed.

FIG. 2 confirms this by showing one example of the flow rate (liters per minute) vs. input speed (revolutions per minute). It should be understood that flow rate is dependent on many factors and the example shown in FIG. 2 is just one example showing a typical result. The volume of fluid pumped rises steeply to peak at three liters per minute at approximately 250 revolutions per minute. However, as input speed increases, the flow rate decreases. This is because at the contact point 18 of the meshing engagement between the drive 14 and driven 16 gears, air and fluid are ingested into the gear mesh together. The higher the input speed, the more air is ingested. This affects the volume of fluid pumped and can limit the effectiveness of the pumping mechanism.

To mitigate this effect, the gear box assembly 10 utilizes several different features. To reduce the amount of ingested air at the collection or contact point 18 of the partially baffled drive 14 and driven 16 gears, radial inlets 50 (FIG. 3) and/or stator vanes 54 (FIG. 4) are incorporated within the housing 12. A radial inlet 50 is formed underneath either or both of the drive 14 and driven 16 gears near the contact point 18. The stator vanes 54 are formed near side edges of either or both of the drive 14 and driven 16 gears. This arrangement serves to draw more oil into the pluralities of drive 22 and driven 24 gear teeth, while extracting some of the entrapped air.

The radial inlets 50 can be formed with various different cross-sections and can include extensions or chamfers 56 of any shape or size. The first and second baffles can include one or both sides of the drive 14 and driven 16 gears being baffled and/or can include any number of stator vanes 54 of various shapes and sizes. This is shown in greater detail in FIGS. 3-6.

Figure 3:
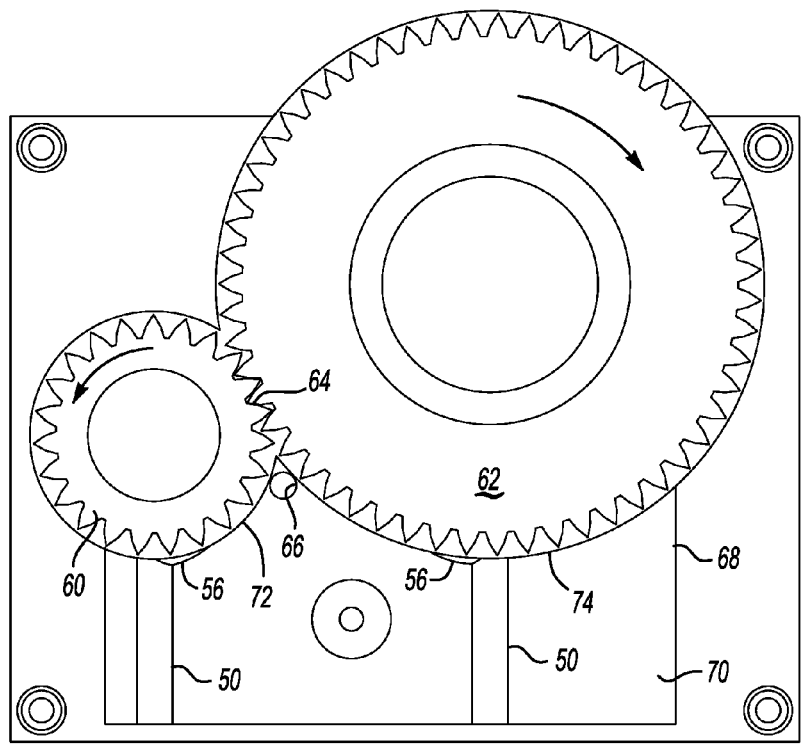
FIG. 3 is an end view showing radial inlets and elongated chamfers formed within a gear housing.

FIG. 3 shows a drive gear 60 in meshing engagement with a driven gear 62 at a contact point 64 as described above. A discharge orifice 66 is formed within a gear box housing 68 and communicates with a fluid gallery (not shown) as described above. The gear box housing 68 includes the radial inlets 50, which are formed in a bottom housing wall portion 70.

The bottom housing wall portion 70 includes a first portion 72 that closely surrounds a bottom portion of the outer circumference of the drive gear 60, and a second portion 74 that closely surrounds a bottom portion of the outer circumference of the driven gear 62. The discharge orifice 66 is positioned between the first 72 and second 74 portions. In the example shown, each of the first 72 and second 74 portions includes a radial inlet 50. The radial inlets 50 are in fluid communication with a sump in the bottom of the gear box housing 68. The radial inlets 50 form small fluid pockets that direct fluid at the outer circumference of the drive 60 and driven 62 gears. The radial inlets 50 preferably include elongated chamfers 56. This is shown in greater detail in FIG. 4.

The elongated chamfers 56 are widest at a radial inlet opening 76 and taper to a narrower portion 78 toward the discharge orifice 66. Further, the elongated chamfers 56 are deepest at the radial inlet opening 76 and are shallowest at the narrower portion 78.

Figure 4:
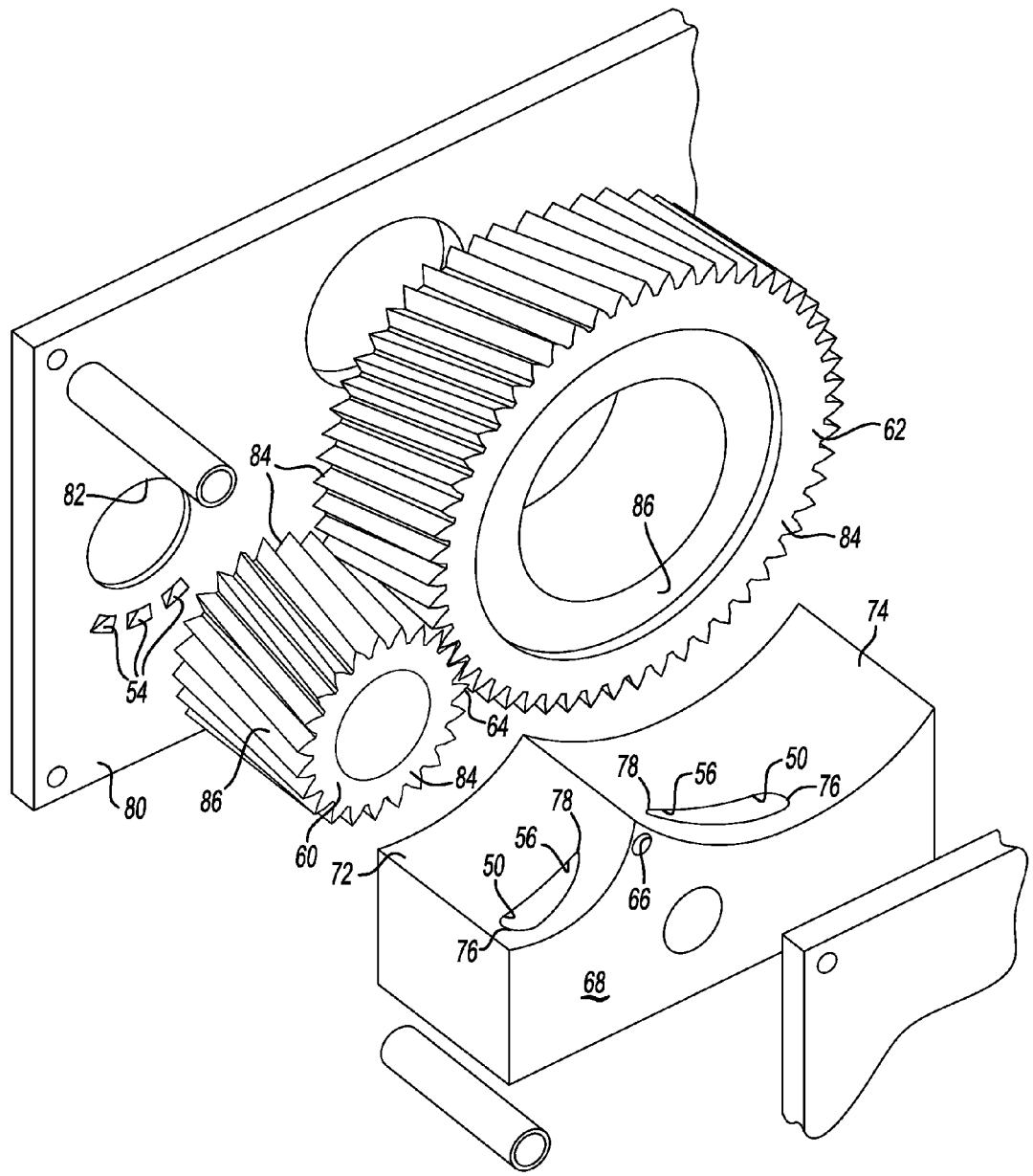
FIG. 4 is an exploded view of one embodiment showing radial inlets and stator vanes formed within the gear housing.
Figure 5:
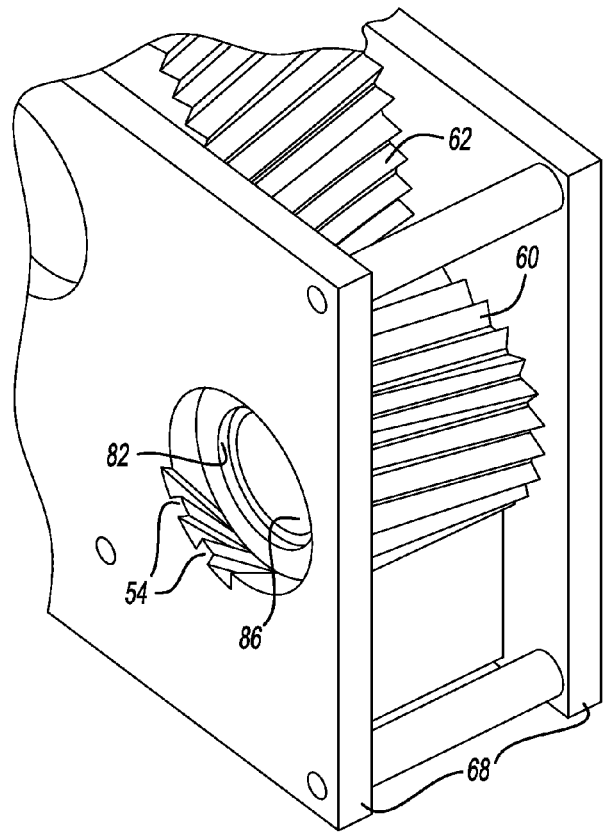
FIG. 5 is an assembled view of the embodiment of FIG. 4.

As shown in FIG. 4, the stator vanes 54 are formed within a side wall portion 80 of the gear box housing 68. The gear box housing 68 includes an opening 82 through which a drive shaft (not shown) extends that supports the drive gear 60. The stator vanes 54 are preferably formed circumferentially about the opening 82. The stator vanes 54 can be formed only about a small circumferential portion of the opening 82 as shown in FIG. 5, or can be formed about the entire circumference.

Also as shown, the stator vanes 54 are positioned adjacent a side face 84 of a gear body 86. The stator vanes 54 can be formed near only one of the gear bodies 86 for the drive 60 and driven 62 gears, or could be formed near both of the gear bodies 86. Further, stator vanes 54 could be formed near one or both side faces 84 of the drive 60 and driven 62 gears. The stator vanes 54 are preferably angled to extend in a direction transverse to a first plane defined by one of the side faces 84 of the gear bodies 86 (see FIG. 6).

Figure 6:
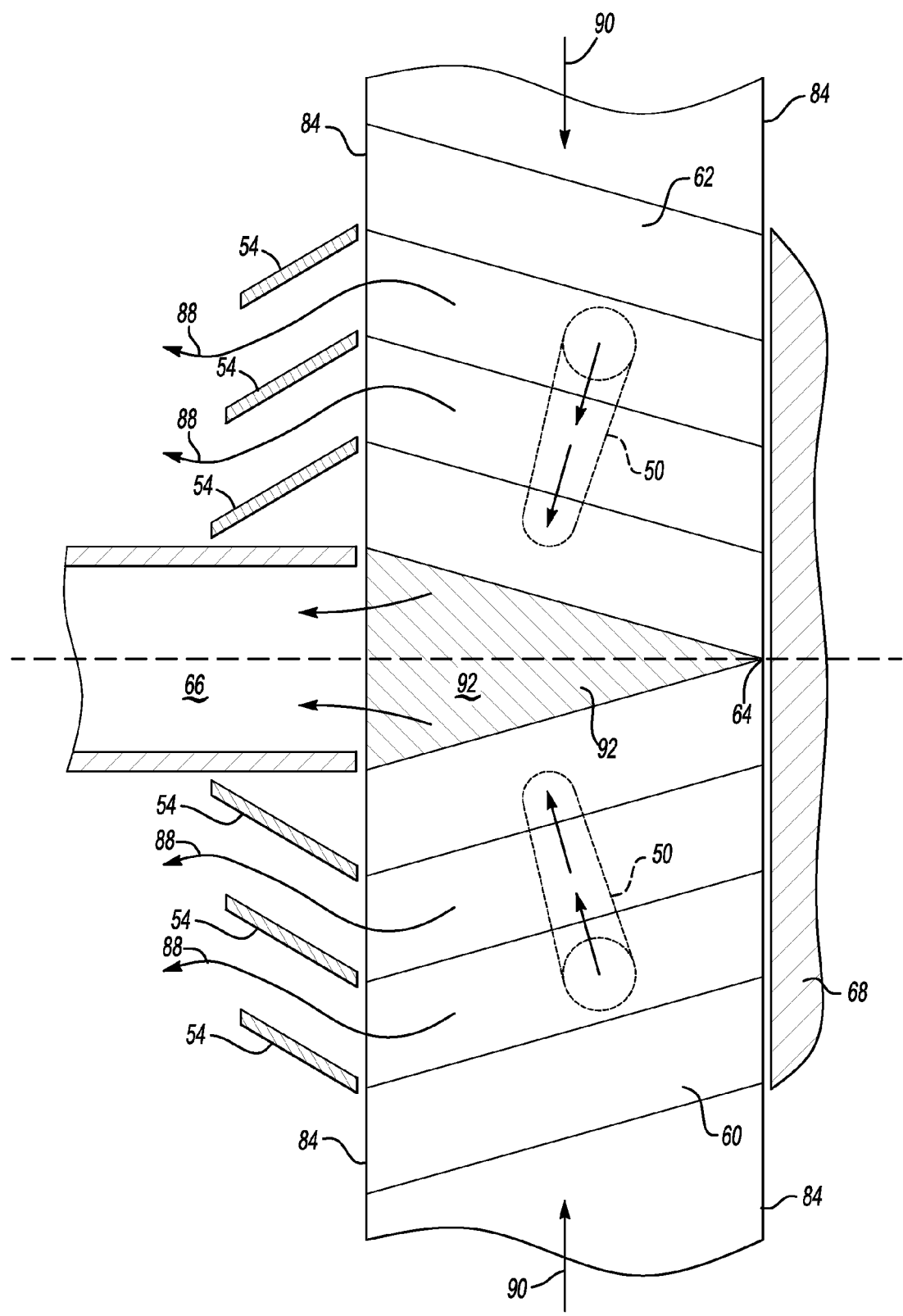
FIG. 6 is a schematic diagram of air and fluid flow paths within the gear box assembly of the embodiment of FIG. 4.

As shown in FIG. 6, the radial inlets 50 and the stator vanes 54 cooperate to draw air away from the discharge orifice 66 as indicated by arrows 88. The drive gear 60 meshes with the driven gear 62 at mesh line or contact point 64. Air and fluid enter the gear teeth for each of the drive 60 and driven 62 gears as indicated by arrows 90 and are directed toward the radial inlets 50. The gear box housing 68 is tightly baffled at a first side face 84 of the drive 60 and driven 62 gears and the stator vanes 54 extend from an opposite side face 84 of the drive 60 and driven 62 gears.

As the drive 60 and driven 62 gears rotate, a positive displacement region 92 is formed where virtually all contents of tooth regions adjacent to the contact point 18 will be pumped to an outlet at the discharge orifice 66. The radial inlets 50, the elongated chamfers 56, and the stator vanes 54 cooperate to draw off the ingested air as indicated at 88, thus increasing the amount of fluid in region 92.

One disadvantage with the configuration set forth above is that the at least some portion of one of the drive and driven gears must be immersed in lubrication fluid. If a gear box assembly is configured such that the fluid fill level is below the drive and driven gears that form the pumping mechanism, no fluid will be pumped.

To address this problem, a suction baffle is utilized. In the configuration shown in FIG. 7, a suction baffle 100 is incorporated into a gear box assembly 102 that includes a housing 104 that encloses a drive 106 and driven 108 gear that operate as described above. The housing 104 includes a first baffle portion 110 at the drive gear 106 and a second baffle portion 112 at the driven gear 108 similar to that described above.

The first 110 and second 112 baffle portions are formed at bottom portions of the drive 106 and driven 108 gears near a sump 116. The suction baffle 100 is positioned on an opposite side from the first 110 and second 112 baffle portions near top portions of the drive 106 and driven 108 gears. The suction baffle 100 includes a first portion 120 that closely surrounds a portion of the outer circumference of the drive gear 106 and a second portion 122 that closely surrounds a portion of the outer circumference of the driven gear 108.

A discharge orifice 124 is formed between the first 110 and second 112 baffle portions in a manner similar to that described above with regard to the other embodiments. The suction baffle 100 cooperates with the first 110 and second 112 baffle portions to draw fluid upwardly from the sump 116 into an inlet 128 extending toward the drive 106 and driven 108 gears. A bypass port 130 crosses and is in fluid communication with the inlet 128. The bypass port 130 draws air into a bypass loop passage 132 that forms a suction outlet port 134 in the suction baffle 100. Fluid is drawn in an opposite direction into the discharge orifice 124 and into a fluid gallery 138 where it is discharged through an outlet 140 at a specified area within the housing 104. Please note that while only one bypass port 130 is shown near the drive gear 108, the driven gear 106 could also include such a port.

Figure 8A:
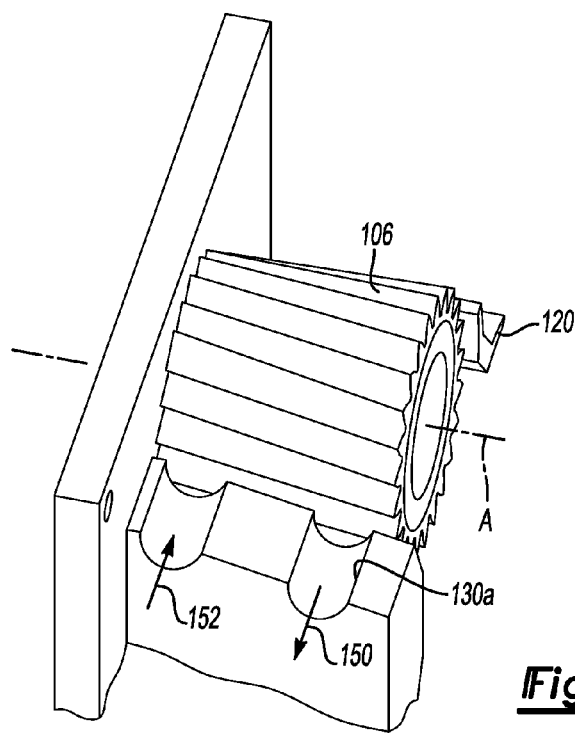
FIG. 8A is one example of a port configuration for the embodiment of FIG. 7.
Figure 8B:
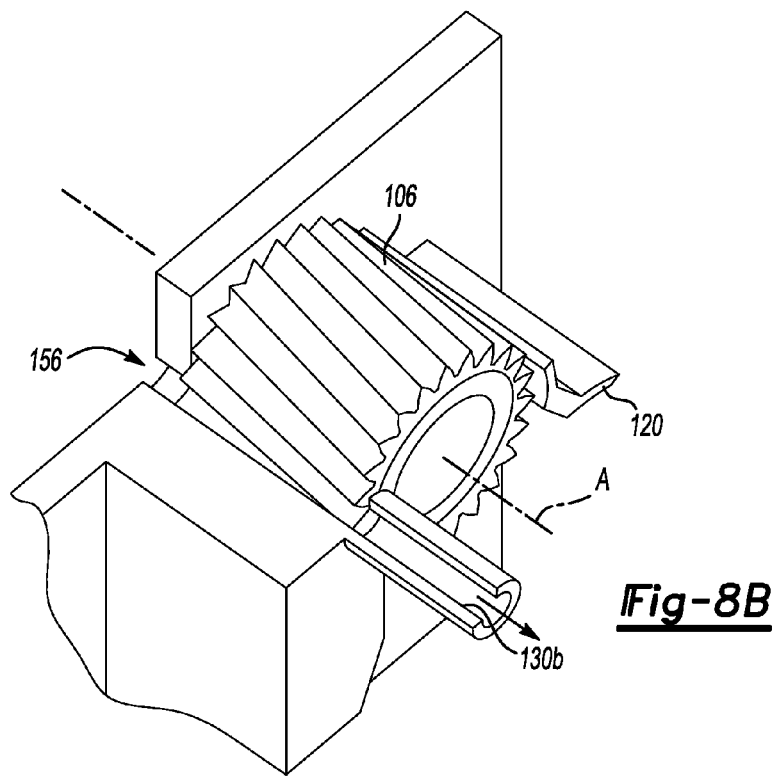
FIG. 8B is another example of a port configuration for the embodiment of FIG. 7.

The bypass port 130 can be configured as a radial port 130*a* as shown in FIG. 8A or an axial/lateral port 130*b* as shown in FIG. 8B. The radial port 130*a* sucks air in a direction transverse to an axis of rotation A defined by the drive gear 106, as indicated by arrow 150. Fluid from the sump 116 enters a tooth cavity of drive gear 106 in a direction transverse to the axis of rotation A as indicated by arrow 152. The axial/lateral port 130*b* sucks air in a direction generally parallel to the axis of rotation A, as indicated by arrow 154. Fluid from the sump 116 enters the tooth cavity of drive gear 106 in a direction generally parallel to the axis of rotation A as indicated by arrow 156.

Figure 7:
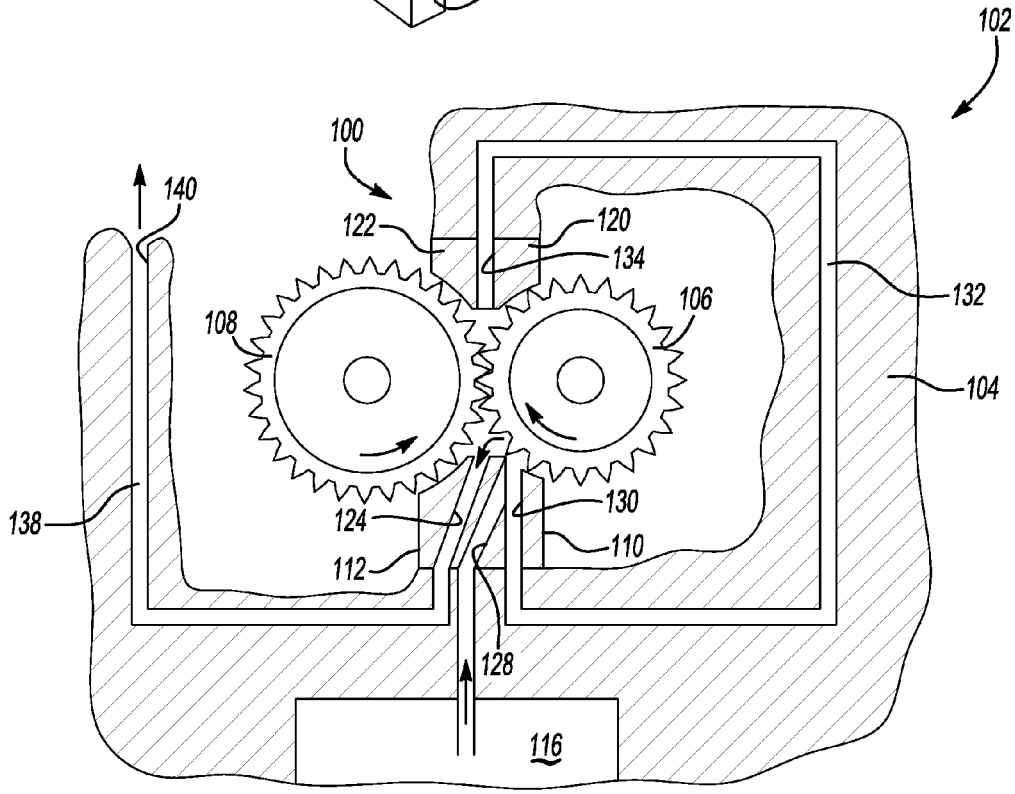
FIG. 7 is another embodiment of a gear box assembly incorporating the subject invention.

This configuration utilizes a radial or lateral inlet in one or both baffles 110, 112, along with a bypass port 130 and bypass loop passage 132, to scavenge unwanted air ingested into meshing gear teeth. This bypass loop passage 132 connects a suction side of the gear mesh with the suction outlet port 134 that is offset from the inlet port 128 on a discharge side as shown in FIG. 7. This serves to provide suction across the gear teeth from the sump 116 at the inlet port 128 to the bypass port 130, which partially fills each meshing tooth cavity with fluid and draws off a corresponding amount of air. Because the inlet port 128 and bypass loop passage 132 operate in essentially "closed volume" sections of the baffles 110, 112, 120, this approach provides a true positive displacement pump that is essentially pumping two fluids, i.e. oil and air for example.

One advantage with this configuration is that relatively large power transmitting gears can be baffled in very little space near the mesh or contact point, which provides an excellent pump in a compact and simple arrangement. Also, due to the incorporation of the suction baffle 100, the pumping mechanism can work with gear teeth above a normal fill level of the sump 116. This provides the possibility of operating axles and transfer cases in a "dry sump" running mode of operation with increased efficiency and lower oil temperatures.

The volumetric efficiency of this pumping mechanism is tailored for different applications by varying radial and lateral baffle clearances, especially suction side baffles, to obtain a desired fluid/air balance and overall flow rate. For low pressure applications, such as transferring oil in axles, transmissions, and transfer cases, this volumetric efficiency does not need to be very high, typically on the order of less than 20% and at only about 1 psi of pumping pressure. This means that the power transmitting gears do not experience any significant increase in load in order to also act as a transfer style pump.

Figure 9:
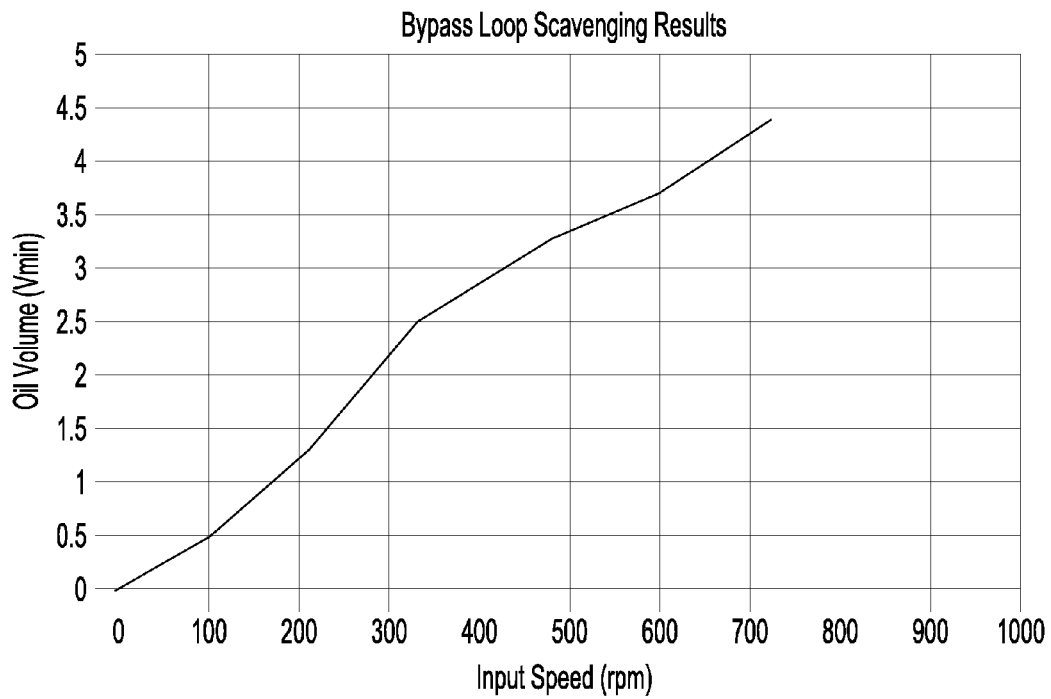
FIG. 9 is a graph of oil volume vs. input speed.

FIG. 9 shows experimental results of oil volume (liters per minute) vs. input speed (rpm). The graph shows a virtually linear response indicated at 150 in flow and a desirable flow increase.

Figure 10:
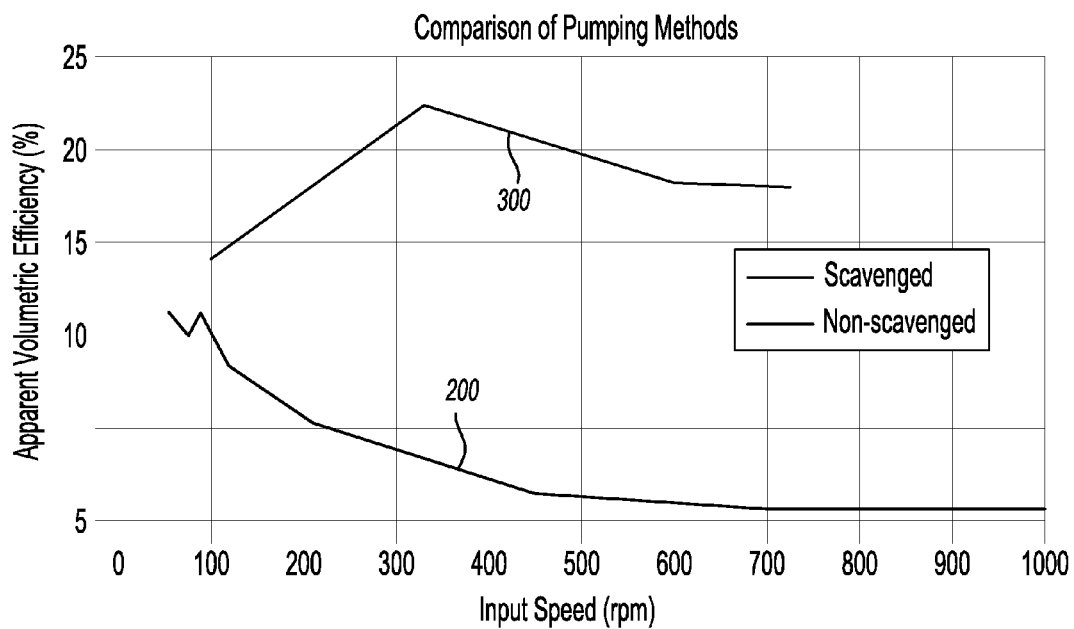
FIG. 10 is a graph of volumetric efficiency vs. input speed.

FIG. 10 shows experimental results of apparent volumetric efficiency (%) vs. input speed (rpm). Line 200 represents a non-scavenged, i.e. no bypass loop, configuration and line 300 represents a scavenged configuration. The scavenged flow is clearly more advantageous, giving a more consistent apparent and sustained volumetric efficiency.

The subject pumping mechanism could also potentially be operated at high pressures if the gear teeth are designed to handle extra loading. High pressure applications may require a pressure relief valve and filtering arrangement.

The pumping mechanism works well with any type of gear configuration including spur gears as shown in FIG. 1 and helical gears as shown in FIGS. 4 and 5. Further, the pumping mechanism can be utilized in various different gear box applications.

As shown in FIG. 1A, a gear box assembly incorporating the subject pumping mechanism is incorporated into an inverted portal axle 400. The inverted portal axle 400 includes a differential 402 that is coupled to a driving input shaft 404. The differential 402 drives a short axle shaft 406 that drives a first wheel 408, and a long axle shaft 410 that drives a laterally spaced second wheel 412. Gear box assemblies 114 with the subject pumping mechanism are mounted at each of the first 408 and second 412 wheels. Each gear box assembly 414 includes a drive gear that is coupled to one of the short 406 and long 410 axle shafts and a driven gear that is driven by the drive gear. The driven gear is operably coupled to an output 416 that drives the first 408 and second 412 wheels.

Figure 11A:
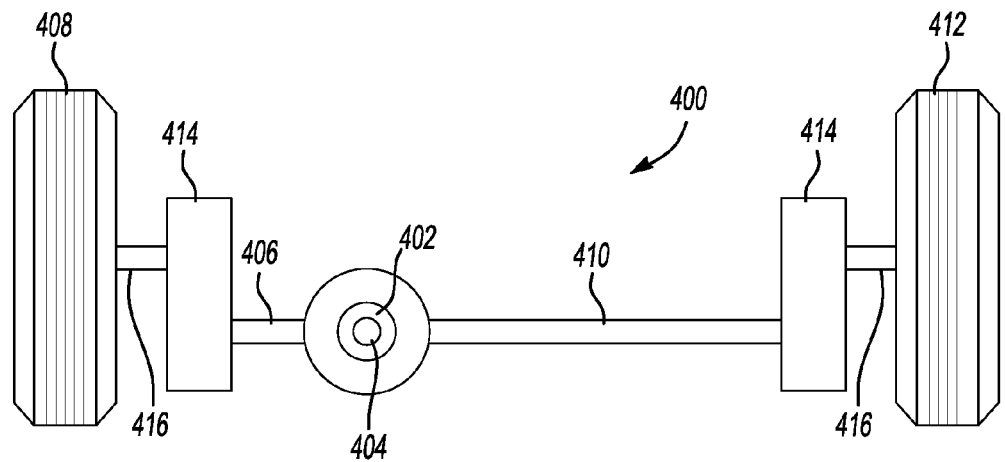
FIG. 11A is a schematic view of a gear box assembly incorporating the subject invention in an inverted portal axle configuration.
Figure 11B:
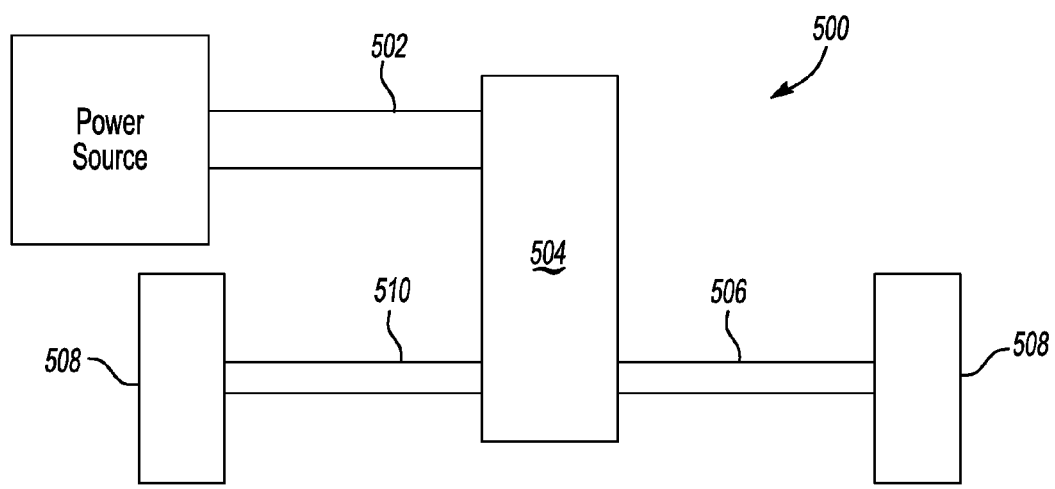
FIG. 11B is a schematic view of a gear box assembly incorporating the subject invention in a transfer case application.

As shown in FIG. 11B, a gear box assembly incorporating the subject pumping mechanism is incorporated into a transmission or transfer case 500. The transfer case 500 receives driving input from a shaft 502 coupled to a drive gear enclosed within a housing 504. The drive gear drives a driven gear which is operably coupled to drive at least one output shaft 506 for driving a first vehicle component 508. The driven gear could also be selectively coupled to drive a second output shaft 510 for driving a second vehicle component 512. The first 508 and second 512 vehicle components could comprise drive axles, for example.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle driveline assembly comprising:
   a housing;
   a drive gear positioned within said housing and driven by an input shaft receiving input from a vehicle driveline component;
   a driven gear positioned within said housing and in meshing engagement with said drive gear at a contact point, said driven gear transferring driving torque to drive a vehicle wheel;
   said housing including a first housing portion that immediately surrounds at least a portion of an outer circumference of said drive gear to form a first baffle and a second housing portion that immediately surrounds at least a portion of an outer circumference of said driven gear to form a second baffle, said housing including a discharge orifice positioned adjacent said contact point;
   a bypass port that draws air away from said discharge orifice toward an outlet port;
   a fluid passage formed within said housing to communicate fluid pumped at said contact point from said discharge orifice to another predetermined location within said housing; and
   wherein at least one of said first and second baffles includes an inlet port in fluid communication with a sump adjacent said discharge orifice, and said inlet port being located within said housing between said discharge orifice and said bypass port on a common side of said contact point.

2. The vehicle driveline assembly according to claim 1 wherein said drive gear includes a drive gear body with a plurality of drive gear teeth formed about said outer circumference of said drive gear body, and said driven gear includes a driven gear body with a plurality of driven gear teeth formed about said outer circumference of said driven gear body.

3. The vehicle driveline assembly according to claim 2 wherein said first housing portion only extends along a lower portion of the outer circumference of said drive gear body on one side of said contact point and said second housing portion only extends along a lower portion of the outer circumference of said driven gear body on an opposite side of said contact point.

4. The vehicle driveline assembly according to claim 3 wherein said discharge orifice is formed within a housing wall positioned between said first and second housing portions.

5. The vehicle driveline assembly according to claim 3 wherein said drive gear body includes a first drive gear side and a second drive gear side opposite said first drive gear side and wherein said first housing portion includes a first base wall portion at the outer circumference of said drive gear body and a first pair of side walls that extend transversely to said first base wall portion; and
   wherein said driven gear body includes a first driven gear side and a second driven gear side opposite said first driven gear side and wherein said second housing portion includes a second base wall portion at the outer circumference of said driven gear body and a second pair of side walls that extend transversely to said second base wall.

6. The vehicle driveline assembly according to claim 5 including a suction baffle formed within said housing on an opposite side of said drive and said driven gears from said first and said second baffles, said outlet port being formed within said suction baffle, and wherein said bypass port allows air and fluid to be separated such that fluid is drawn into said discharge orifice while air is drawn through said bypass port and into a bypass air passage which terminates at said outlet port.

7. The vehicle driveline assembly according to claim 2 wherein said fluid passage comprises a fluid gallery including a plurality of outlet openings formed, within a housing wall with each of said plurality of outlet openings being located at a different predetermined position within said housing.

8. The vehicle driveline assembly according to claim 7 wherein at least one of said plurality of outlet openings is a different size than another one of said plurality of outlet openings.

9. The vehicle driveline assembly according to claim 2 including a drive gear fluid inlet formed within said first housing portion and a driven gear fluid inlet formed within said second housing portion, said drive and said driven gear fluid inlets forming fluid pockets within said first and said second housing portions near said contact point.

10. The vehicle driveline assembly according to claim 9 wherein said drive gear fluid inlet comprises a radial inlet having an elongated chamfer extending in a direction generally along the outer circumference of said drive gear body, and said driven gear fluid inlet comprises a radial inlet having an elongated chamfer extending in a direction generally along the outer circumference of said driven gear body.

11. The vehicle driveline assembly according to claim 2 including at least one stator vane formed in at least one of the first and second housing portions near said discharge orifice to draw air ingested at said contact point away from said discharge orifice.

12. The vehicle driveline assembly according to claim 11 wherein said at least one stator vane comprises at least one first stator vane formed in said first housing portion along one side of said plurality of drive gear teeth and at least one second stator vane formed in said second housing portion along one side of said plurality of driven gear teeth.

13. The vehicle driveline assembly according to claim 12 wherein said at least one first stator vane comprises a plurality of first stator vanes with each of said plurality of first stator vanes extending in a first direction transverse to a first plane defined by a side face of said drive gear and wherein said at least one second stator vane comprises a plurality of second stator vanes with each of said plurality of second stator vanes extending in a second direction transverse to a second plane defined by a side face of said driven gear.

14. The vehicle driveline assembly according to claim 13 wherein said first and said second directions are non-parallel.

15. The vehicle driveline assembly according to claim 1 wherein said housing comprises a transfer case housing with said input shaft adapted to receive driving input from a vehicle driveshaft driven by a vehicle power source and wherein said driven gear is operably connectable to at least one output shaft that drives at least one vehicle drive axle that supports at least a pair of laterally spaced vehicle wheels.

16. The vehicle driveline assembly according to claim 1 wherein said housing comprises a wheel end housing for an inverted portal axle and wherein said input shaft is driven by a differential gear assembly and said driven gear is operably connected to an output shaft adapted to drive the vehicle wheel.

17. The vehicle driveline assembly according to claim 1, wherein said bypass port comprises one of an axial port that extends along a direction of an axis of rotation defined by said drive gear and a radial port that extends along a direction transverse to said axis of rotation.

18. The vehicle driveline assembly according to claim 1 wherein said housing defines an inner cavity that holds lubrication fluid, and wherein said drive and driven gears are positioned within said inner cavity such that a lower portion of each of the drive and driven gears is only partially submerged within the lubrication fluid with the first and second housing portions only partially extending around the outer circumferences of the drive and driven gears such that an upper portion of each of the drive and driven gears is not submerged within the lubrication fluid.

19. The vehicle driveline assembly according to claim 18 wherein 50% or less of said outer circumferences of said drive and said driven gears are surrounded by said first and said second housing portions.

20. The vehicle driveline assembly according to claim 19 wherein each of said first and second housing portions comprise a bottom wall portion and a pair of side walls that are positioned proximate to opposing side faces of a respective one of said drive and driven gears and wherein said first and said second housing portions transition outwardly away from said drive and said driven gears into main wall portions that define said internal cavity.

21. The vehicle driveline assembly according to claim 1 wherein said housing comprises a wheel end gear housing and wherein said drive and said drive gears comprise a wheel end gear set that receives driving input from an axle shaft and transmits driving torque to drive the vehicle wheel.

22. The vehicle driveline assembly according to claim 1 wherein said first baffle only extends along a lower portion of the outer circumference of said drive gear body on one side of said contact point and said second baffle only extends along a lower portion of the outer circumference of said driven gear body on an opposite side of said contact point, and wherein said discharge orifice is positioned immediately adjacent said contact point such that said drive and driven gears cooperate to pump fluid into said discharge orifice, through said fluid passage to said outlet port within said housing to provide lubrication to said predetermined location within the same housing.

23. The vehicle driveline assembly according to claim 1 wherein said discharge orifice is positioned immediately adjacent to one side of said contact point, and wherein said housing defines an inner cavity that holds lubrication fluid in said sump, and wherein said drive and driven gears are positioned within said inner cavity such that only a lower portion of each of the drive and driven gears is only partially submerged within the lubrication fluid such that an upper portion of each of the drive and drive gears is not submerged within the lubrication fluid, and wherein said bypass port draws air into a bypass air passage that directs air away from said discharge orifice and toward another outlet port formed within a suction baffle in said housing that is positioned on an opposite side of said contact point from said discharge orifice.

24. A vehicle driveline assembly:
a driveshaft receiving driving input from a vehicle power source;
a drive axle assembly receiving driving input from said driveshaft to drive laterally spaced vehicle wheels;
a gear set including a drive gear receiving driving input from said driveshaft and a driven gear in meshing engagement with said drive gear at a contact point, said driven gear transferring driving torque to at least one vehicle wheel of said laterally spaced vehicle wheels;
a gear housing comprising a main housing portion defining an internal cavity having a sump that receives lubrication fluid, a first housing portion immediately surrounding a lower portion of an outer circumference of said drive gear to form a first baffle, and a second housing portion immediately surrounding a lower portion of an outer circumference of said driven gear to form a second baffle, said main housing portion including a discharge orifice positioned adjacent said contact point and between said first and said second baffles;
a bypass port that draws air away from said discharge orifice toward an outlet port;
a fluid passage formed within said main housing portion that extends from said discharge orifice to another predetermined location to communicate fluid pumped at said contact point from said discharge orifice to another predetermined location within said housing; and
wherein at least one of said first and second baffles includes an inlet port in fluid communication with a sump adjacent said discharge orifice, and said inlet port being located within said housing between said discharge orifice and said bypass port on a common side of said contact point.

25. The vehicle driveline assembly according to claim 24 wherein said gear housing comprises one of an axle component housing or a transfer case housing.

26. The vehicle driveline assembly according to claim 25 wherein said gear housing comprises an axle component housing and wherein said axle component housing comprises a wheel end gear housing with said drive and driven gears of said gear set comprising a wheel end gear set, and wherein said driveshaft comprises a laterally extending axle shaft that is driven by a vehicle driveshaft and drives said drive gear, said drive gear driving said driven gear to transmit driving torque to drive the at least one vehicle wheel.

27. The vehicle driveline assembly according to claim 26 including an inverted portal axle having a differential that receives driving input from said vehicle driveshaft, a first axle shaft transferring driving torque from said differential to a first wheel, and a second axle shaft transferring driving torque from said differential to a second wheel laterally spaced from the first wheel, said first axle shaft being shorter than said second axle shaft, and wherein said wheel end gear set comprises a first wheel end gear set driven by said first axle shaft and a second wheel end gear set driven by said second axle shaft.

28. The vehicle driveline assembly according to claim 25 wherein said gear housing comprises a transfer case housing and said drive and driven gears of said gear set comprise a transfer case gear assembly, and wherein said driveshaft comprises a vehicle driveshaft that is driven by the vehicle power source, and wherein said driven gear is coupled to drive said drive axle assembly.

29. The vehicle driveline assembly according to claim 24 wherein each of said first and second housing portions comprise a bottom wall portion and a pair of side walls that are positioned immediately proximate to opposing side faces of a respective one of said drive and driven gears and wherein said first and said second housing portions transition into said main wall portion, and wherein said drive and driven gears are positioned within said inner cavity such that a lower portion of each of the drive and driven gears is only partially submerged within the lubrication fluid with said first and second housing portions only surrounding 50% or less of said outer circumferences of said drive and said driven gears such that an upper portion of each of the drive and drive gears is not submerged within the lubrication fluid.

30. The vehicle driveline assembly according to claim 24 wherein said first baffle only extends along a lower portion of the outer circumference of said drive gear body on one side of said contact point and said second baffle only extends along a lower portion of the outer circumference of said driven gear body on an opposite side of said contact point, and wherein said discharge orifice is positioned immediately adjacent said contact point such that said drive and driven gears cooperate to pump fluid into said discharge orifice, through said fluid passage to said outlet port in said housing to provide lubrication to said predetermined location within the same housing.

31. The vehicle driveline assembly according to claim 24 wherein said discharge orifice is positioned immediately adjacent on one side of said contact point, and wherein said housing defines an inner cavity that holds lubrication fluid in said sump, and wherein said drive and driven gears are positioned within said inner cavity such that only a lower portion of each of the drive and driven gears is only partially submerged within the lubrication fluid such that an upper portion of each of the drive and drive gears is not submerged within the lubrication fluid, and including said bypass port that draws air away from said discharge orifice toward another outlet port formed within a suction baffle in said housing that is positioned on an opposite side of said contact point from said discharge orifice.

32. The vehicle driveline assembly according to claim 31 including a suction baffle formed within said housing on an opposite side of said drive and said driven gears from said first and said second baffles, said outlet port being formed within said suction baffle, and wherein said bypass port allows air and fluid to be separated such that fluid is drawn into said discharge orifice while air is drawn into said bypass air passage that terminates at said outlet port.

33. The vehicle driveline assembly according to claim 24 including said bypass port that draws air away from said discharge orifice, into a bypass air passage, and toward said outlet port.

34. The vehicle driveline assembly according to claim 33 wherein at least one of said first and second baffles includes an inlet passage in fluid communication with said sump adjacent said discharge orifice, and wherein said bypass port fluidly intersects said inlet passage at a location that is discrete from said discharge orifice.

* * * * *